Patent text

3,452,444
MERIDIAN DETECTOR
Takeshi Hojo, Tokyo, Japan, assignor to Kabushikikaisha Tokyo Keiki Seizosho (Tokyo Keiki Seizosho Co., Ltd.), Tokyo, Japan, a corporation of Japan
Filed Jan. 5, 1966, Ser. No. 518,963
Claims priority, application Japan, Feb. 26, 1965, 40/11,133
Int. Cl. G01c 19/38, 19/28
U.S. Cl. 33—226                                                   5 Claims

ABSTRACT OF THE DISCLOSURE

A meridian detector for land surveying use has a base plate settable into fixed level position by leveling screws. A housing fixed to the base plate supports rotatably on vertical top and bottom shafts a case containing a horizontal axis gyro rotor. A buoying and damping immersing liquid, axially acting electromagnets, and a pumped gas or liquid thrust bearing are means available for balancing the weight of the gyro case. An exterior member carrying a gyro axis direction marker is positioned by manually rotating it to null the indicated output of a pick-off between the member and the rotor case.

---

This invention relates to a high precision meridian detector for determining the meridian on the earth for land surveying purpose, and more particularly to a meridian detector comprising a gyro by which the meridian can be determined even under the ground for tunnelling, subway construction or the like by making use of the north-seeking action of the gyro without making astronomical observations.

According to this invention, the meridian can readily be found even under the ground, through utilization of the north-seeking action of a gyro confined to a horizontal plane, without making astronomical observations.

It has heretofore been proposed to use a meridian detector for determining a reference direction for land surveying by making use of the north-seeking action of the gyro confined to a horizontal plane. In most of the prior art meridian detectors, the outer case and the gyro are coupled together by some restoring means. With such meridian detectors, when the outer case does not point to the true north there is a deviation between the outer case and the gyro, and hence the gyro is subjected to a restoring force produced by the restoring means in response to the deviation. Then, the outer case is rotated by hand so as to remove the deviation or the restoring force. In this manner the meridian is finally found. However, the gyro and the outer case are coupled together by the restoring means as described above, so that when the outer case is rotated a certain angle to the initial position of the gyro the gyro is also rotated through the restoring means in accordance with the rotation of the outer case. In such a case the gyro presents a transient phenomenon for a little while and finally comes to rest. At this rest position, however, the gyro does not yet point to the true north due to the restoring means. Therefore, the outer case is manually operated again and also in this case it takes some time for the gyro to come to rest owing to the transient phenomenon. After such an operation is repeated the gyro finally comes to point to the true north. Thus, the prior art meridian detectors require a considerable amount of time and skill to find the meridian.

It is one object of this invention to provide a meridian detector which is simple in structure but high in precision.

It is another object of this invention to provide a meridian detector in which the gyro case is subjected to a force balancing its weight without applying a restoring force to the gyro, thereby finding the meridian easily and quickly.

It is still another object of this invention to provide a meridian detector in which no restoring force is required for the gyro and the manual operation of the outer case without moving the base of the meridian detector does not disturb the north-seeking action of the gyro.

It is a further object of this invention to provide a meridian detector which is high in precision but does not require a great deal of skill and in which once the gyro has come to rest along the meridian after the north-seeking action the meridian can readily be known in only a short time by rotating the outer case in a manner so that the index line of the outer case may be in alignment with that of the gyro.

It is a still further object of this invention to provide a meridian detector in which a liquid floating the gyro serves as a damper for the north-seeking action of the gyro and hence no special damper is required.

Other objects, features and advantages of this invention will become apparent from the following description taken in conjunction with the accompanying drawings, in which.

Figure 1:
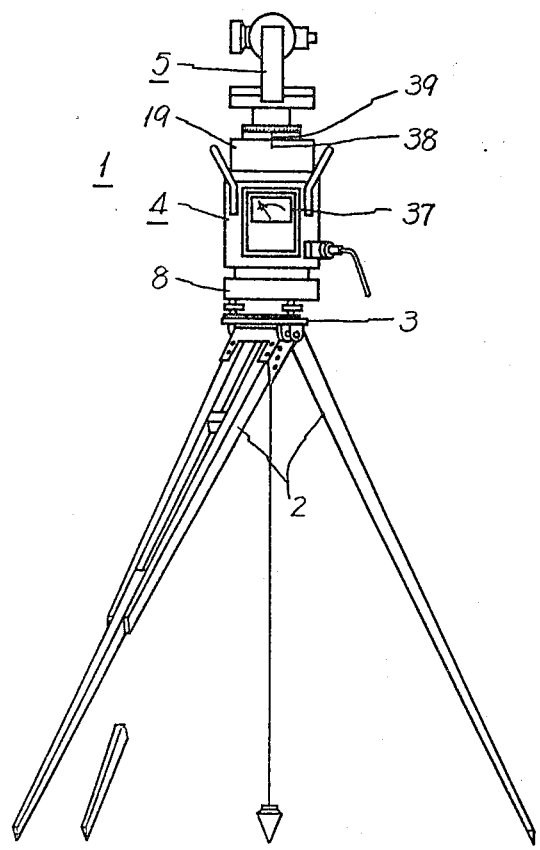
FIGURE 1 is a diagram schematically illustrating an example of the meridian detector according to this invention.

Referring to the drawings, the present invention will be described in detail.

In FIGURE 1 the reference numeral 1 generally identifies an instrument produced according to this invention and a device 4 constituting the principal part of this invention is placed on a base 3 on a tripod 2. Mounted on the device 4 is a transit 5.

Figure 2:
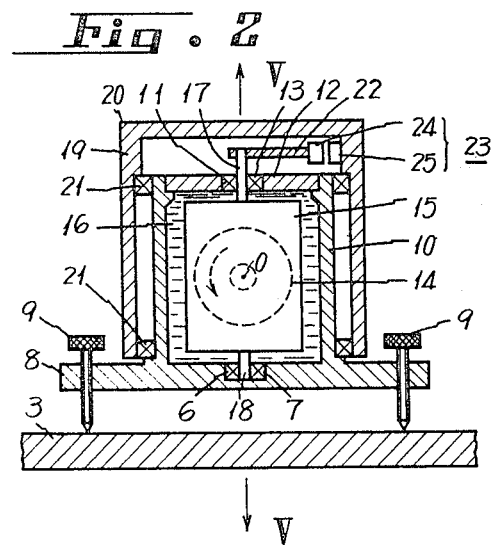
FIGURE 2 is a schematic cross-sectional view of the principal part of the meridian detector according to this invention.

In FIGURE 2 there is illustrated in cross section one example of the device 4, in which there is disposed on the base 3 a fixed base plate 8 having a concave hole 6 formed in the central portion thereof and a bearing 7 disposed in the hole, as illustrated in the figure. On the margin of the base plate 8, there are concentrically provided a plurality of adjusting screws 9 spaced substantially equiangular about the axis of the bearing 7 of the base plate 8 and the screws 9 are so adapted that their lower points may abut on the base 3.

On the base plate 8, there is provided a cylindrical body or housing 10 integrally therewith which extends upwards concentrically with the bearing 7, and a support plate 12 having a central aperture 11 is mounted on the cylindrical body 10 over its opening end. A bearing 13 is provided in the central aperture 11. In this case, the bearings 7 and 13 may be, for example, ball bearings or magnetic bearings. In short, it is preferred to use those bearings whose frictional resistance is as small a possible. The bearings 7 and 13 lie along the same perpendicular axis V—V.

Within a cavity of the cylindrical body 10, a liquid 16 is contained and a cylindrical gyro case 15 having accommodated therein a gyro 14 is disposed as a float. That is, the gyro case 15 is immersed in the liquid 16 in such a manner that the weight of the gyro case 15 and its buoyancy due to the liquid 16 are in equilibrium. The liquid 16 may be an oil such, for example, as is known under the trademark "Daifloil" which is a polymer of chlor trifluor ethylene. In order to obtain such an equilibrium condition, it is possible to select suitability the weight and size of the gyro case 15 and the level of the liquid 16.

The rotary shafts 17 and 18 of the gyro case 15 respectively project out from its upper and lower end faces and these projecting shafts are journalled respectively by the bearings 13 and 7, so that the vertical shafts of the gyro case lie along the perpendicular axis V—V and the gyro 14 is confined to a horizontal plane. The spin axis O of the gyro 14 is perpendicular with respect to the plane of the paper.

Figure 3:
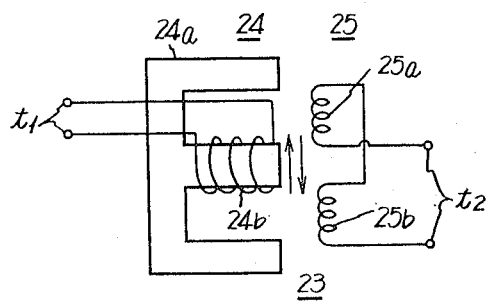
FIGURE 3 is a connection diagram illustrating an example of non-contact type deviation detecting means usable in the meridian detector of this invention.

Further, a cylindrical outer case 19 having an upper end face 20 is disposed around the cylindrical body 10, which is supported, rotatable about the axis V—V, by means of bearings provided between the inner circumferential surface of the outer case 19 and the outer circumferential surface of the cylindrical body 10. The upper rotary shaft 17 projcets out from the support plate 12 and an arm 22 is attached to the projecting end of the shaft 17. There are provided at the free end of the arm 22 and at a position opposite thereto on the outer case 19 elements 24 and 25 cooperating with each other in such a manner as to constitute non-contact type deviation detecting means 23. The non-contact type deviation detecting means 23 may be, for example, a differential transformer such as illustrated in FIGURE 3. Accordingly, the element 24 consists of an E-shaped core 24a and an exciting winding 24b while the element 25 comprises two detecting coils 25a and 25b in opposing relation to the element 24, the coils being connected to each other in a differential manner. The non-contact type deviation detecting means 23 is so adapted that when the coils 25a and 25b exactly confront the element 24 no voltage is produced at the output terminal and when they move from such a confronting position a voltage is produced in accordance with the movement, thereby to detect electrically the rotational deviation of the outer case 19 relative to the gyro case 14. The reference character $t_1$ indicates input terminals of the exciting winding and $t_2$ output terminals of the detecting coils. In this case, the non-contact type deviation detecting means 23 may be composed of a pointer as the element 24 and a scale as the element 25, in place of the differential transformer. Further, it is also possible to employ a light source emitting a sharp light ray as the element 24 and a scale for receiving it as the element 25. Any other desired means may be taken which perform similar indicating action.

In FIGURE 1 the reference numeral 37 represents an instrument for indicating such relative deviations, which is mounted on the outer circumferential surface of the outer case 19. As illustrated in FIGURE 1, an index line 38 is provided on the outer circumferential surface or the top of the outer case 19, the index line 38 being aligned with the index line 39 of the transit 5.

In the example illustrated, the outer case 19 is cylindrical in shape but it need not be always so. In short, the outer case 19 is required only to be a rotary body which rotates about the axis V—V. Accordingly, the outer case 19 may be a frame or a disc having mounted thereon the element 25 and the transit 5.

The operation of the above-described instrument will hereinafter be explained. The instrument is initially adjusted by means of the adjusting screws 9 in such a manner that the vertical shafts 7 and 13 of the gyro case 14 may exactly lie along the axis V—V. Then, the gyro is rotated at a predetermined high speed and in this case the vertical shafts 7 and 13 are not subjected to any load in the axial direction due to the buoyancy of the liquid 16 so that substantially no friction is produced in the vertical shafts 7 and 13. Under such conditions the gyro 14 performs the north-seeking action and then points to the true north by "Foucault's principle." In this case a damping action is produced by the viscous resistance of the liquid 16 with the gyro case 15.

Under such conditions the outer case 19 is rotated by hand until the instrument 37 actuated by the non-contact type deviation detecting means 23 reads null. In this manner, the position can be found at which no relative deviation occurs between the outer case 19 and the gyro case 15 and, at this position, the index line 38 of the outer case 19 is coincident with the spin axis of the gyro 14, therefore the index line 38 also indicates the meridian.

In the instrument of the present invention the outer case 19 having mounted thereon the transit 5 and the gyro 14 are entirely independent of each other dynamically with the base at rest except for earth rotation as has been described in the foregoing, and hence the manual operation of the outer case 19 does not ever disturb the action of the gyro 14. That is, once the gyro has come to rest, the gyro continues to point to the true north during surveying at that station, so that the surveying can be accomplished more easily and quickly than with the use of the prior art meridian detectors. Further, since the liquid 16 serves as a damper oil, there is no necessity for the provision of special damping means.

Figure 4:
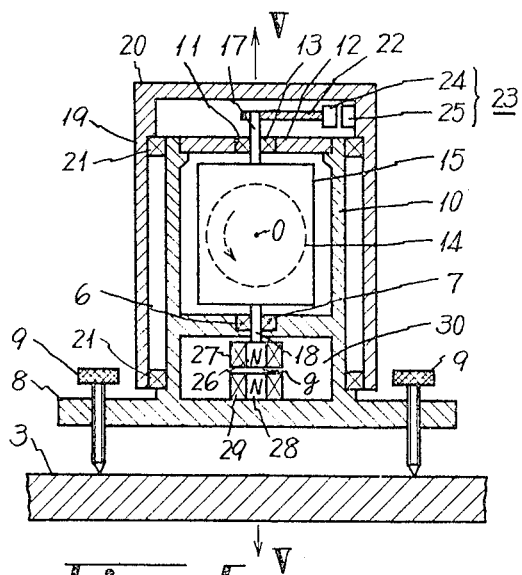
FIGURES 4 and 5 are cross-sectional views of the principal part of the meridian detector of this invention, each schematically illustrating an example thereof.

FIGURE 4 illustrates another example of this invention in which magnetic means are provided for balancing the weight of the gyro case 15. To this end, a cavity 30 is provided between the plate having the lower beareing 7 and the fixed base plate 8 and a magnetic core 26 having wound thereon a coil 27 is attached to the lower end of the lower shaft 18, while a magnetic core 28 having wound thereon a coil 29 is mounted on the fixed base plate 8 in spaced relation to the core 26, as indicated by a gap $g$. Thus, electromagnetically operated means are constituted. To the coils 27 and 29 is applied a current such that the confronting ends of the magnetic cores 26 and 28 may be polarized the same and that the weight of the rotary portion including the gyro case and connected thereto may balance with the repulsive force of the magnetic means. As a result of this, the gyro case is held at a predetermined position and consequently the elements 24 and 25 are kept opposite to each other.

In this example, the repulsive force of the cores 26 and 28 respectively mounted on the shaft 18 of the gyro case 15 and the fixed base plate 8 is made use of as a magnetic balancing force. However, the attractive force of the cores may be utilized instead of the repulsive force. In such a case, the magnetic core 26 having wound thereon the coil 27 is attached to the upper shaft 17 while the magnetic core 28 having the coil 29 is mounted on an arm (not illustrated) attached to the plate 12. In some cases, the lower shaft 18 is further extended downward and the magnetic core 26 having the coil 27 is attached to the extended end of the shaft 18 and then the core 28 having the coil 29 is fixed to the underside of the plate having the bearing 7.

Since the other portions of this example are similar to those described with FIGURE 2, the similar portions are identified by the same reference numerals and no further detailed description will be given for the sake of brevity.

Figure 5:
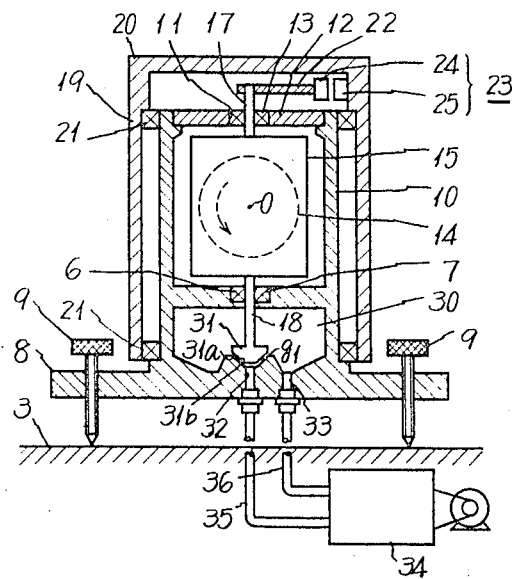

FIGURE 5 illustrates another modified form of the principal part of the instrument according to this invention, in which the weight of the gyro case is balanced with a fluid pressure. That is, a sealed cavity 30 is provided between the plate having the bearing 7 and the fixed base plate 8 and the lower shaft 18 projects out into the sealed cavity 30 and then a pressure-receiving member 31 is mounted to the projecting end of the shaft 18 as illustrated. The pressure-receiving member 31 is V-shaped in cross section and the bottom of the sealed cavity 30 is formed to be face 31b of inverted V-shaped cross section at the place just opposite to the V-shaped surface 31a of the pressure-receiving member 31, the surface 31a of the pressure-receiving member 31 and the face 31b of the bottom of the cavity 30 being spaced a constant distance as identified at $g_1$. At the bottom of the face 31b there is provided an outlet 32 of a fluid through the fixed base plate 8, and an aperture 33 is also made through the plate 8. A fluid pressure source 34 is provided, from which a pressure pipe is connected to the outlet 32 and a return pipe 36 is also connected to the aperture 33.

The liquid for this purpose may be gas such as air or liquid such as oil. In case of using air, the return pipe 36 may be omitted or the cavity 30 need not be sealed.

With such an arrangement as described above, the fluid is blown off into the cavity 30 through the outlet 32 and the gap $g_1$. In this case the fluid pressure applied to the pressure-receiving member 31 is suitably selected so that the gyro case 15 may be supported in equilibrium. The fluid pressure source 34 is, of course, provided with a pump or compressor for producing pressure. The pressure-receiving member 31 need not be always V-shaped in cross section but may be of any desired shape.

The other portions in this example are similar to those described with FIGURE 2 and the operation and effect can easily be understood from the foregoing description made in connection with FIGURE 2, so that parts corresponding to those in FIGURE 2 are marked with the same reference numerals and no further detailed explanation will be given for the sake of brevity.

It will be apparent that many modifications and variations may be effected without departing from the scope of the novel concepts of this invention.

What I claim is:

1. A meridian detector for land surveying use comprising:
   a fixed base plate;
   a housing fixed to said base plate, said housing having a cavity and having a pair of bearings disposed on opposite sides of said cavity on an axis;
   a gyro case having accommodated therein a gyro rotor and having a pair of vertical shafts extending outwardly therefrom, said gyro case being disposed in said cavity with said shafts being rotatably mounted in said bearings so that the axis of the shafts is coincidental with the axis of said bearings;
   means provided in connection with said gyro case for applying a force to the gyro case for balancing the weight of said gyro case including said gyro rotor, and for applying a damping force to the north-seeking action of said gyro case;
   a body having an index line, said body rotatably mounted exteriorly on said housing for rotational movement about the axis of said bearing;
   deviation detecting means provided in connection with said gyro case and said body for indicating in a non-contact manner the deviation therebetween; and
   means journalled on said fixed base plate for adjusting the coincidental axes of said pair of vertical shafts to be substantially aligned with the direction of gravity, whereby when the coincidental axes of said vertical shafts coincide with the direction of gravity by said last-mentioned means and the spin axis of said gyro rotor coincides with the meridian, said index line can be positioned to correspond with the meridian by rotating said body with respect to said housing to such an extent that the deviation becomes zero without disturbing meridian detecting action of said gyro rotor.

2. A meridian detector for land surveying use according to claim 1, wherein said first-mentioned means is a liquid disposed in said cavity.

3. A meridian detector for land surveying use according to claim 1, wherein said deviation detecting means is a differential transformer consisting of an E-shaped core having wound thereon an exciting winding which case is mounted on the free end of an arm attached to one of said vertical shafts of said gyro case and a member having two detecting coils which is mounted on said body in opposing relation to said E-shaped core.

4. A meridian detector for land surveying use according to claim 1, wherein said first-mentioned means includes magnetic balancing means disposed opposite to each other between said gyro case and said fixed base plate.

5. A meridian detector for land surveying use according to claim 1, wherein said first-mentioned means is a mechanism for applying a fluid pressure to the gyro case and a portion connected thereto, said mechanism consisting of a fluid pressure source and a member for applying a fluid pressure to the portion from the fluid pressure source.

References Cited

UNITED STATES PATENTS

| | | | |
|---|---|---|---|
| 1,240,872 | 9/1917 | Perry et al. | 33—226 |
| 2,139,558 | 12/1938 | Moseley et al. | |
| 2,142,018 | 12/1938 | Carter. | |
| 2,972,195 | 2/1961 | Campbell et al. | 33—226 |
| 3,283,408 | 11/1966 | Rothe et al. | |

FOREIGN PATENTS

| | | |
|---|---|---|
| 768,000 | 5/1955 | Germany. |
| 842,272 | 12/1952 | Germany. |
| 9,737 | 4/1911 | Great Britain. |
| 180,413 | 5/1922 | Great Britain. |
| 682,908 | 11/1952 | Great Britain. |

ROBERT B. HALL, *Primary Examiner.*

U.S. Cl. X.R.

74—5.6, 5.9